N. KOLTZ.
VALVED PISTON.
APPLICATION FILED OCT. 24, 1918.

1,306,382.

Patented June 10, 1919.

WITNESSES:

INVENTOR
Nicholas Koltz
BY
ATTORNEY

UNITED STATES PATENT OFFICE.

NICHOLAS KOLTZ, OF FOND DU LAC, WISCONSIN, ASSIGNOR, BY DIRECT AND MESNE ASSIGNMENTS, TO PHILLIP H. WEAVER, OF FOND DU LAC, WISCONSIN.

VALVED PISTON.

1,306,382.  Specification of Letters Patent.  Patented June 10, 1919.

Application filed October 24, 1918. Serial No. 259,573.

*To all whom it may concern:*

Be it known that I, NICHOLAS KOLTZ, a subject of the Emperor of Germany, and resident of Fond du Lac, in the county of Fond du Lac and State of Wisconsin, have invented certain new and useful Improvements in Valved Pistons; and I do hereby declare that the following is a full, clear, and exact description thereof.

My invention relates to new and useful improvements in pumps, more particularly of that portable type adapted for inflating tires or for similar uses.

Air pumps of this character are usually provided with a piston head carrying a cupped packing member, which is dilated to packing engagement with the cylinder wall by air pressure at one side of the head, and which is yieldable to permit air to flow between it and the cylinder whereby to introduce the compression charge of air into the cylinder. A considerable objection is encountered in the use of a valve packing of this character by reason of the escape of air which may occur prior to the building up of sufficient compression pressure in the cylinder to expand the packing member and effect a proper seal with the wall of the cylinder, this disadvantage being increased upon stiffness of the packing member due to continued use of the pump, and upon the use of the pump for procuring the relatively high pressures necessary in automobile tire inflation.

It is primarily the object of my invention to provide a pump structure wherein an efficient packing between the piston head and cylinder wall is at all times maintained, and wherein the flow of air past the piston is controlled in a positive manner so that the pump will immediately take up its work of compression upon starting the compression stroke of the piston, and so that a most ready flow of the compression charge of air past the piston head may be permitted.

A further object of my invention resides in the provision of a piston head structure for pumps of this character which may be manufactured at a minimum cost consistent with a maximum efficiency of operation.

A further object resides in the provision of an improved packing arrangement for the piston head.

With the above and other objects and advantages in view, which will be apparent as the description proceeds, my invention resides in the novel features of construction, combination and arrangement of parts as hereinafter described and defined by the appended claims.

Figures 1, 2:
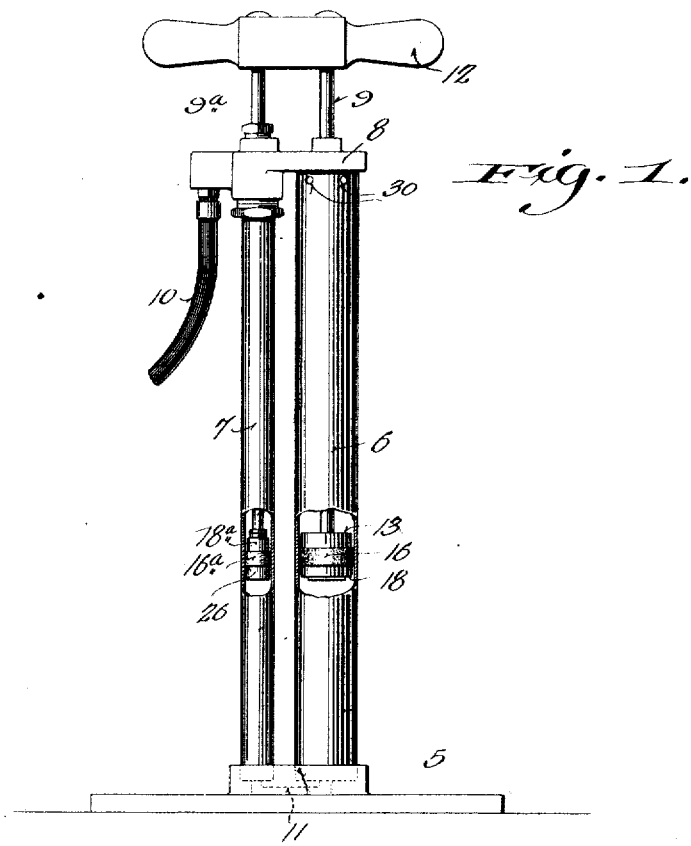
Figure 1 shows my invention applied to a pump of the conventional double cylinder type used for inflating automobile tires, or similar uses.
Fig. 2 is a fragmentary sectional view of the cylinders and piston heads.

Referring now more particularly to the accompanying drawings, 5 designates a pump base on which are mounted the pump cylinders 6 and 7 respectively, connected at their upper ends by the usual head 8 in which the piston rods 9 and 9ª are slidable. A flexible tube 10 extends from the head and is in conventional communication with the cylinder 7. The lower ends of this cylinder are connected by the usual passage 11 shown in dotted lines in Fig. 1. The upper ends of the piston rods are provided with a common handle 12. The piston head of the larger cylinder 6 comprises a cylindrical block 13 provided with a central longitudinal bore 14 having its lower portion enlarged, the intermediate portion of the bore being taperingly reduced to merge into the diameters of the upper and lower portions. The lower portion of the block is externally reduced, forming an annular shoulder 15 at its juncture with the upper portion of the block, and this shoulder forms a seat for the laterally turned upper side portion of a packing band 16. A follower ring 17 is loosely mounted on the lower portion of the piston head block and fits within the follower ring to bear against its laterally turned portion, and a nut 18 is threaded on the head block and bears against the follower ring to clamp the laterally turned portion of the packing band between the ring and the shoulder 15. It is noted that the width of the packing band is such that in this clamping relation, the lower end of the band engages the nut 18 and the band is thus transversely compressed whereby to expand it against the wall of the cylinder to procure a maximum packing efficiency.

A valve seating ring 19 is shrunk within the enlarged portion of the bore of the head block, being spaced inwardly from the mouth of said enlarged portion, and a retaining disk 20 is shrunk in said mouth portion. A flat conical valve member is confined between the disk 20 and the ring 19, and is adapted to seat against said ring to close the bore, said valve member 21 being provided with axially extended pins 22 engaging in the disk 20 and in the passage of the seating ring 19 whereby to hold the valve member for proper seating movement. It is noted that the valve member is nearly equal in diameter to the bore, whereby to further prevent lateral movement thereof, and the peripheral portion of the valve members is recessed at intervals to facilitate passage of air therepast. The holding disk 20 is provided with an annular series of ports 23 which open at the peripheral portion of the valve and which assist in seating the valve by impinging the air against said peripheral portion or skirt of the valve. The valve piston rod 9 is secured to the head block by threaded engagement of its lower end in the bore 14, which thus closes the upper portion of the bore. Passage of air from the intermediate portion of the bore is effected by longitudinal bores 24 extending from the top of the head block and communicating with radial bores 25 which open into the intermediate portion of the main longitudinal bore 14. It is noted that the outer ends of these radial bores 25 are closed by the follower sleeve 17.

Thus, upon downward movement of the piston head block, the valve member 22 will seat immediately against the ring 19, particularly by impingement of air against its skirt portion through the ports 22, and thus prevent passage of air through the piston head. In the outward movement of the piston head, free passage of air is permitted through the bores 25 and through the main bore 14 around the valve member.

The piston head of the smaller cylinder 7 comprises a somewhat similar block 26 which is inverted whereby to provide a seating shoulder 15ª for the laterally turned portion of a packing member 16ª which is compressed and held by a follower ring 17ª and nut 18ª similar to the heretofore described follower ring 17 and nut 18. The bore 14ª of the block is counter sunk at its lower portion, and a valve seating ring 27 is shrunk in the lower end of the counter sunk bore. A ball valve 28 is resiliently urged against this seating ring by an expansible coil spring 29 within the counter sunk bore. The piston rod 9ª is threaded in the upper end of the bore 14ª, and the block 26 is provided with longitudinal bores 24ª extending from its upper end and communicating with radial bores 25ª opening into the main bore 14ª similar to the bores of the piston head block 13. The outer ends of the radial bores 25ª are closed by the follower nut 18ª, it being noted that in each instance a follower member of the piston head packing closes the radial communicating bores of the head.

The upper end of the cylinder 6 is provided with the usual inlet ports 30, and in operation, downward movement of the piston 9 will close the valve of the piston head 12, thus compressing air in the large cylinder 6, which compressed air flows through the passage 11 and through the cylinder 7 and its piston head 26 into the supply tube 10. Upon upward movement of the piston heads, air is compressed in the smaller cylinder 7 and flows through the piston head of the larger cylinder, the compressing load being thus lighter on the upstroke as is usual in pumps of this nature. With my improved piston heads, the load is immediately taken up on both strokes, thus materially increasing the output of the pump over the type now in common use.

What is claimed is:

1. A valved piston comprising a head block provided with a bore therethrough, one end portion of the bore being counter sunk, a valve seat member fitted in said counter sunk portion, and a valve carried by the head block and engageable against said seat, an operating rod threaded in the other end of the bore of the head and ports extending through the block from the counter sunk portion.

2. A valved piston including a cylindrical block provided with a longitudinal bore and with radial bores communicating with the longitudinal bore and with a series of longitudinal bores communicating with said radial bores, an actuating rod connected with the block, a packing disposed about the block, and a follower member for holding said packing disposed about the block and closing the outer ends of the radial bores.

3. A valved piston comprising, a cylindrical head block provided with an intermediate annular shoulder and provided with a passage therethrough, a valve member in the block controlling flow of fluid through the passage, a cylindrical packing member having one end portion laterally turned to seat on the shoulder, a follower ring disposed within the annular packing member and bearing against the laterally turned portion thereof, and a follower nut threaded on the head block and engaging said ring to clamp the laterally turned portion of the packing member against the shoulder.

4. A valved piston comprising, a cylindrical head block provided with an intermediate annular shoulder and provided with a passage therethrough, a valve member in the block controlling flow of fluid through the passage, a cylindrical packing member having one end portion laterally turned to seat on the shoulder, a follower ring disposed within the annular packing member and bearing against the laterally turned portion thereof, and a follower nut threaded on the head block and engaging said ring to clamp the laterally turned portion of the packing member against the shoulder, said nut engaging the adjacent side portion of the packing member to compress said packing member between said nut and the laterally turned portion of the packing member.

In testimony that I claim the foregoing I have hereunto set my hand at Fond du Lac, in the county of Fond du Lac and State of Wisconsin.

NICHOLAS KOLTZ.